United States Patent
Kim et al.

(10) Patent No.: US 10,885,790 B2
(45) Date of Patent: Jan. 5, 2021

(54) APPARATUS AND METHOD FOR DETERMINING INTENTION TO CUT IN

(71) Applicants: Hyundai Motor Company, Seoul (KR); Kia Motors Corporation, Seoul (KR)

(72) Inventors: Dae Young Kim, Gwangmyeong-si (KR); Kyoung Jun Lee, Seoul (KR); Doo Jin Um, Seoul (KR); Dong Gu Lee, Seoul (KR); Dong Eon Oh, Seoul (KR); Hyun-Jae Yoo, Seoul (KR); Beom Jun Kim, Seoul (KR); Young Min Han, Gunpo-si (KR); Seung Geon Moon, Hwaseong-si (KR); Sung Woo Choi, Gwangmyeong-si (KR); Chan-Il Park, Yanggang-myeon (KR); Sung Yoon Yeo, Seoul (KR); Hoi Won Kim, Gwacheon-si (KR); Min Chul Kang, Uiwang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 61 days.

(21) Appl. No.: 16/127,050

(22) Filed: Sep. 10, 2018

(65) Prior Publication Data

US 2019/0180626 A1    Jun. 13, 2019

(30) Foreign Application Priority Data

Dec. 13, 2017 (KR) .................. 10-2017-0171608

(51) Int. Cl.
*B60W 30/08*  (2012.01)
*G08G 1/16*   (2006.01)
*B60W 30/16*  (2020.01)

(52) U.S. Cl.
CPC ............ *G08G 1/167* (2013.01); *B60W 30/08* (2013.01); *B60W 30/16* (2013.01); *G08G 1/166* (2013.01);
(Continued)

(58) Field of Classification Search
CPC .... B60W 10/184; B60W 10/06; B60W 10/18; B60W 30/16; B60W 2420/52;
(Continued)

(56) References Cited

U.S. PATENT DOCUMENTS

| 5,530,771 A * | 6/1996 | Maekawa ................. G01S 5/16 340/435 |
| 6,636,148 B2 * | 10/2003 | Higuchi ............... G05D 1/0246 340/435 |

(Continued)

FOREIGN PATENT DOCUMENTS

| JP | 2017-087923 A | 5/2017 |
| JP | 2017-128286 A | 7/2017 |

(Continued)

OTHER PUBLICATIONS

Automated vigilant transportation system for minimizing the Road accidents; ; Chaitra V.R. Thota;Lavanya K. Galla;Ramya Narisetty;Uttam Mande; 2014 International Conference on Electronics, Communication and Computational Engineering (ICECCE); IEEE Conference Paper; (year 2018).*

(Continued)

*Primary Examiner* — Cuong H Nguyen
(74) *Attorney, Agent, or Firm* — Morgan, Lewis & Bockius LLP

(57) ABSTRACT

An apparatus configured for determining an intention to cut in in a vehicle may include a navigation module, a camera, a radar configured to obtain data about an external vehicle, a sensor configured to obtain data about behavior of the (Continued)

| | POSSIBILITY OF CUTTING IN | |
|---|---|---|
| CURVATURE | LEFT | RIGHT |
| ~ 200R | VERY LOW | VERY LOW |
| 200R ~ 500R | LOW | LOW |
| 500R~ | NORMAL | NORMAL | vehicle, and a processor configured to be electrically connected to the navigation module, the camera, the radar, and the sensor, wherein the processor is configured to obtain information associated with at least a portion of a road environment, traffic, or road curvature based on data obtained using at least a portion of the navigation module, the camera, the radar, or the sensor and adjust a parameter for determining an intention for a surrounding vehicle which is traveling in a second lane adjacent to a first lane where the vehicle is traveling to cut in, based on the obtained information.

17 Claims, 9 Drawing Sheets

(52) U.S. Cl.
CPC ..... *B60W 2420/42* (2013.01); *B60W 2420/52* (2013.01); *B60W 2554/4041* (2020.02); *B60W 2554/801* (2020.02); *B60W 2554/803* (2020.02); *B60W 2554/804* (2020.02); *B60W 2720/106* (2013.01); *B60W 2720/125* (2013.01)

(58) Field of Classification Search
CPC ....... B60W 2420/42; B60W 2720/106; B60W 2550/308; B60W 2550/302; B60W 2550/304; B60W 2550/306
USPC ................... 701/96, 301; 340/903, 436–437
See application file for complete search history.

(56) References Cited

U.S. PATENT DOCUMENTS

| | | | | |
|---|---|---|---|---|
| 7,444,241 | B2* | 10/2008 | Grimm | B60T 7/22 340/901 |
| 8,237,909 | B2* | 8/2012 | Ostreko | B60R 1/12 349/195 |
| 8,280,560 | B2* | 10/2012 | Huang | B60W 30/12 340/436 |
| 8,411,245 | B2* | 4/2013 | Lee | B60R 1/12 349/195 |
| 9,669,872 | B2* | 6/2017 | Rebhan | B60Q 9/00 |
| 2002/0087255 | A1* | 7/2002 | Jindo | B62D 15/026 701/96 |
| 2007/0150196 | A1* | 6/2007 | Grimm | B60T 7/22 701/301 |
| 2010/0023245 | A1* | 1/2010 | Huang | B60W 30/12 701/117 |
| 2013/0138714 | A1* | 5/2013 | Ricci | B60R 7/04 709/201 |
| 2015/0246677 | A1* | 9/2015 | Ekenberg | B60W 30/16 701/96 |
| 2015/0321699 | A1* | 11/2015 | Rebhan | B60Q 9/00 701/23 |
| 2017/0080940 | A1* | 3/2017 | Ito | B60W 30/16 |
| 2017/0344023 | A1* | 11/2017 | Laubinger | G05D 1/0272 |
| 2018/0222424 | A1* | 8/2018 | Kodama | B60R 21/0134 |
| 2018/0354419 | A1* | 12/2018 | Choi | H04N 5/247 |
| 2019/0120640 | A1* | 4/2019 | Ho | G06Q 50/30 |
| 2019/0227545 | A1* | 7/2019 | Yoo | G01C 21/3602 |
| 2019/0248380 | A1* | 8/2019 | Tatourian | B60W 30/0956 |
| 2019/0277644 | A1* | 9/2019 | Stephens | G08G 1/096827 |
| 2020/0182640 | A1* | 6/2020 | Ho | G01C 21/3461 |
| 2020/0192367 | A1* | 6/2020 | Choi | B60W 30/143 |
| 2020/0201899 | A1* | 6/2020 | Lin | G01C 21/32 |

FOREIGN PATENT DOCUMENTS

| | | |
|---|---|---|
| JP | 2017-154614 A | 9/2017 |
| KR | 10-2015-0101621 A | 9/2015 |
| KR | 10-1576055 B1 | 12/2015 |
| KR | 10-2017-0035808 A | 3/2017 |

OTHER PUBLICATIONS

Mobile vehicle crash detection system; Tey Han Yee;Phooi Yee Lau; 2018 International Workshop on Advanced Image Technology (IWAIT); IEEE Conference Paper; (year 2018).*

Obstacle detection using combination of disparity and optical flow under around view for driver assistance system; Rong-Chin Lo; Chin-Yi He;Chun-Ju Chiu;Ya-Hui Tsai; 2013 International Conference on Connected Vehicles and Expo (ICCVE); IEEE Conference Paper (year 2013).*

AI Management System to Prevent Accidents in Construction Zones Using 4K Cameras Based on 5G Network;Daichi Nozaki et al.; 2018 21st International Symposium on Wireless Personal Multimedia Communications (WPMC); IEEE Conference paper (year 2018).*

* cited by examiner

APPARATUS AND METHOD FOR DETERMINING INTENTION TO CUT IN

CROSS-REFERENCE TO RELATED APPLICATION

The present application claims priority to Korean Patent Application No. 10-2017-0171608, filed on Dec. 13, 2017, in the Korean Intellectual Property Office, the entire contents of which are incorporated herein for all purposes by this reference.

BACKGROUND OF THE INVENTION

Field of the Invention

The present invention relates to an apparatus and method for determining an intention for a surrounding vehicle to cut in using various data.

Description of Related Art

With the development of the auto industry, a sensor and a system which are capable of obtaining a variety of information, such as a location, a speed, a rotation angle, a length, and a width of a surrounding vehicle, have been developed to provide convenience to a driver. For example, a vehicle may obtain information related to a surrounding vehicle using various sensors such as a front radar, a corner radar, vision, and a light detection and ranging (LiDAR). The vehicle may determine whether the surrounding vehicle has an intention to cut in in front of the vehicle using the sensor and may provide various functions, such as a function of avoiding a collision with the surrounding vehicle, to the driver based on the determined result.

A conventional vehicle may determine an intention to cut in using only a physical value associated with the vehicle, for example, a lateral location, a lateral speed, and/or lateral acceleration of the vehicle and a surrounding vehicle, to determine an intention to cut in. Furthermore, there is a limitation that the conventional vehicle utilizes information related to surrounding environments only when the conventional vehicle is located near a merging or diverging lane in a road merging section or a road diverging section. Since the conventional vehicle simply increases a distance from a preceding vehicle in a merging section or a diverging section, it may increase a distance from the preceding vehicle also when a surrounding vehicle does not have an intention to cut in actually. In this case, a driver may feel uncomfortable due to unnecessary deceleration.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and method for determining an intention to cut in in a vehicle to accurately determine an intention for a surrounding vehicle to cut in depending on a situation of the vehicle using a variety of information associated with a road where the vehicle is traveling.

The technical problems to be solved by the present inventive concept are not limited to the aforementioned problems, and any other technical problems not mentioned herein will be clearly understood from the following description by those skilled in the art to which the present invention pertains.

According to various aspects of the present invention, an apparatus configured for determining an intention to cut in in a vehicle may include: a navigation module configured to obtain data about a road where the vehicle is traveling, a camera configured to obtain image data about an environment around the vehicle, a radar configured to obtain data about an external vehicle, a sensor configured to obtain data about behavior of the vehicle, and a processor configured to be electrically connected to the navigation module, the camera, the radar, and the sensor. The processor may be configured to obtain information associated with at least a portion of a road environment, traffic, or road curvature based on data obtained using at least a portion of the navigation module, the camera, the radar, or the sensor and adjust a parameter for determining an intention for a surrounding vehicle which is traveling in a second lane adjacent to a first lane where the vehicle is traveling to cut in, based on the obtained information.

In an exemplary embodiment of the present invention, the processor may be configured to determine a level of a possibility that the surrounding vehicle will cut in, based on the obtained information and adjust the parameter for determining the intention for the surrounding vehicle to cut in, based on the level.

In an exemplary embodiment of the present invention, the processor may be configured to determine the level of the possibility that the surrounding vehicle will cut in, based on information related to a section of a road where the vehicle is traveling, information related to the number of lanes of the road where the vehicle is traveling, and information related to a lane where the vehicle is traveling.

In an exemplary embodiment of the present invention, the processor may be configured to, when a road section where the vehicle is traveling is connected to an exit ramp, increase the level of the possibility that the surrounding vehicle located in a direction opposite to the exit ramp from the vehicle will cut in.

In an exemplary embodiment of the present invention, the processor may be configured to, when a road section where the vehicle is traveling is connected to an entrance ramp, increase the level of the possibility that the surrounding vehicle located in the same direction as the entrance ramp from the vehicle will cut in.

In an exemplary embodiment of the present invention, the processor may be configured to determine the level of the possibility that the surrounding vehicle will cut in, based on an average driving speed of the first lane and an average driving speed of the second lane.

In an exemplary embodiment of the present invention, the average driving speed of the first lane may be an average speed of the vehicle or a preceding vehicle of the vehicle during a specified time interval. The average driving speed of the second lane may be an average speed of at least some of other vehicles which are traveling in the second lane during the specified time interval.

In an exemplary embodiment of the present invention, the processor may be configured to, when the average driving speed of the first lane is faster than the average driving speed of the second lane, increase the level of the possibility that the surrounding vehicle will cut in.

In an exemplary embodiment of the present invention, the processor may be configured to determine the level of the possibility that the surrounding vehicle will cut in, based on curvature of a road where the vehicle is traveling or a change amount in curvature.

In an exemplary embodiment of the present invention, the processor may be configured to, when the curvature is less than a specified value, reduce the level of the possibility that the surrounding vehicle will cut in.

In an exemplary embodiment of the present invention, the processor may be configured to select the parameter for determining the intention for the surrounding vehicle to cut in among predetermined parameters based on the obtained information.

In an exemplary embodiment of the present invention, the processor may be configured to determine a first level of a possibility of cutting in based on information associated with the road environment, determine a second level of a possibility of cutting in based on information associated with the traffic, determine a third level of a possibility of cutting in based on information associated with the road curvature, and determine the level of the possibility that the surrounding vehicle will cut in, based on the first level, the second level, and the third level.

In an exemplary embodiment of the present invention, the processor may be configured to determine a plurality of levels of possibilities of cutting in based on the obtained information and determine a minimum value or a maximum value among the plurality of levels as the level of the possibility that the surrounding vehicle will cut in.

In an exemplary embodiment of the present invention, the parameter may include at least a portion of a lateral location, a lateral speed, a lateral acceleration, and behavior duration of the surrounding vehicle.

According to various aspects of the present invention, a method for determining an intention to cut in in a vehicle may include: obtaining at least a portion of data about a road where the vehicle is traveling, image data about an environment around the vehicle, data about an external vehicle, or data about behavior of the vehicle, obtaining information associated with at least a portion of a road environment, traffic, or road curvature based on the obtained data, and adjusting a parameter for determining an intention for a surrounding vehicle which is traveling in a second lane adjacent to a first lane where the vehicle is traveling to cut in, based on the obtained information.

In an exemplary embodiment of the present invention, the adjusting may include determining a level of a possibility that the surrounding vehicle will cut in, based on the obtained information and adjusting the parameter for determining the intention for the surrounding vehicle to cut in, based on the level.

In an exemplary embodiment of the present invention, the determining may include determining the level of the possibility that the surrounding vehicle will cut in, based on information related to a section of a road where the vehicle is traveling, information related to the number of lanes of the road where the vehicle is traveling, and information related to a lane where the vehicle is traveling.

In an exemplary embodiment of the present invention, the determining may include determining the level of the possibility that the surrounding vehicle will cut in, based on an average driving speed of the first lane and an average driving speed of the second lane.

In an exemplary embodiment of the present invention, the determining may include determining the level of the possibility that the surrounding vehicle will cut in, based on curvature of a road where the vehicle is traveling or a change amount in curvature.

In an exemplary embodiment of the present invention, the adjusting may include selecting the parameter for determining the intention for the surrounding vehicle to cut in among predetermined parameters based on the obtained information.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
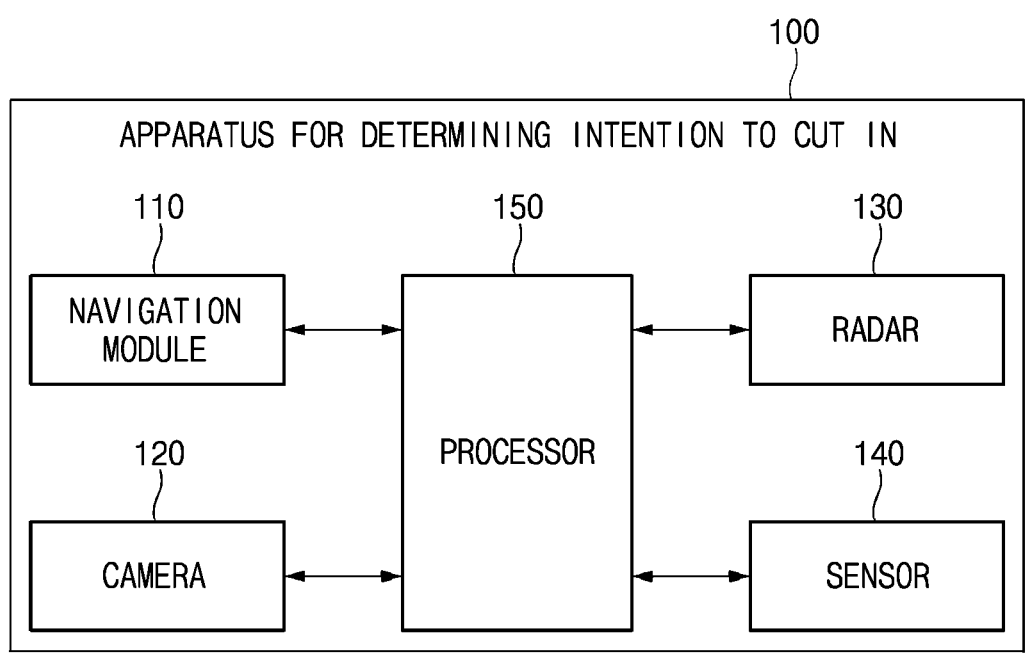
FIG. 1 is a block diagram illustrating a configuration of an apparatus configured for determining an intention to cut in in a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the accompanying drawings. In adding reference denotations to elements of each drawing, although the same elements are displayed on a different drawing, it should be noted that the same elements have the same denotations. Furthermore, in describing an exemplary embodiment of the present invention, if it is determined that a detailed description of related well-known configurations or functions blurs the gist of an exemplary embodiment of the present invention, it will be omitted.

In describing elements of embodiments of the present invention, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus configured for determining an intention to cut in in a vehicle according to an exemplary embodiment of the present invention.

Referring to FIG. 1, an apparatus 100 for determining an intention to cut in in a vehicle according to an exemplary embodiment (hereinafter referred to as "apparatus 100") may include a navigation module 110, a camera 120, a radar 130, a sensor 140, and a processor 150. The apparatus 100 of FIG. 1 may be loaded into the vehicle.

The navigation module 110 may obtain data about a road where the vehicle is traveling. The navigation module 110 may transmit the obtained data to the processor 150. Information associated with, for example, a section (e.g., an interchange (IC) section, a junction (JC) section, a tollgate (TG) section, a diverging section, a merging section, or the like) of a road where the vehicle is traveling, the total number of lanes of the road where the vehicle is traveling, a lane (e.g., a first lane, a second lane, a third lane, or the like) where the vehicle is traveling, and the like, may be obtained from the data obtained by the navigation module 110.

The camera 120 may obtain image data about an environment around the vehicle. The camera 120 may transmit the obtained data to the processor 150. Information associated with, for example, a lateral location of the vehicle, a steering angle of the vehicle, curvature of a road, a change rate in curvature of the road, and the like, may be obtained from the data obtained by the camera 120. Information related to a location, a speed, and the like of an external vehicle may be obtained from the data obtained by the camera 120.

The radar 130 may obtain data about an external vehicle. The radar 130 may transmit the obtained data to the processor 150. Information associated with, for example, a location, a speed, and the like of the external vehicle, may be obtained from the data obtained by the radar 130.

The sensor 140 may obtain data about behavior of the vehicle. The sensor 140 may transmit the obtained data to the processor 150. Information related to, for example, a speed, a yaw rate, and the like of the vehicle, may be obtained from the data obtained by the sensor 140.

The processor 150 may be electrically connected to the navigation module 110, the camera 120, the radar 130, and the sensor 140. The processor 150 may control the navigation module 110, the camera 120, the radar 130, and the sensor 140 and may perform a variety of data processing and various arithmetic operations.

According to an exemplary embodiment of the present invention, the processor 150 may obtain data using at least a portion of the navigation module 110, the camera 120, the radar 130, or the sensor 140. The processor 150 may obtain information associated with at least a portion of a road environment, traffic, or road curvature based on the obtained data. For example, the processor 150 may obtain information associated with a road environment, for example, information related to a section of a road where the vehicle is traveling, information related to the number of lanes of the road where the vehicle is traveling, information related to a lane where the vehicle is traveling, and the like. For another example, the processor 150 may obtain information associated with traffic, for example, an average driving speed of a first lane where the vehicle is traveling, an average driving speed of a second lane where a surrounding vehicle is traveling, and the like. For another example, the processor 150 may obtain information associated with road curvature, for example, curvature of the road where the vehicle is traveling, a change rate in curvature, and the like.

According to an exemplary embodiment of the present invention, the processor 150 may adjust a parameter for determining an intention for a surrounding vehicle which is traveling in a second lane adjacent to a first lane where the vehicle is traveling to cut in, based on obtained information. For example, the processor 150 may determine a level of a possibility that a surrounding vehicle will cut in, based on obtained information and may adjust a parameter for determining an intention for the surrounding vehicle to cut in, based on the level. The processor 150 may determine a level of the possibility that the surrounding vehicle will cut in and may differently apply a parameter which is a criterion for determining an intention to cut in, depending on the possibility that the surrounding vehicle will cut in. For example, the processor 150 may determine an intention to cut in faster than a usual situation by applying a low criterion for determining an intention to cut in to a surrounding vehicle with a high possibility of cutting in. Thus, an accident by the surrounding vehicle with the high possibility of cutting in may be prevented. For another example, the processor 150 may determine an intention to cut in more conservatively than the usual situation by applying a high criterion for determining an intention to cut in to a surrounding vehicle with a low possibility of cutting in. Thus, the processor 150 may reduce incorrect determination of an intention for the surrounding vehicle with the low possibility of cutting in to cut in. The parameter may include at least a portion of, for example, a lateral location, a lateral speed, a lateral acceleration, and behavior duration of a surrounding vehicle. The processor 150 may adjust a lateral location, a lateral speed, lateral deceleration, and behavior duration which are criteria for determining an intention to cut in. For example, when a lateral speed of a surrounding vehicle is maintained at a specified value or more during behavior during in the direction of the vehicle, the processor 150 may determine that the surrounding vehicle has an intention to cut in.

According to an exemplary embodiment of the present invention, the processor 150 may determine a level of a possibility that a surrounding vehicle will cut in, based on information related to a section (e.g., an IC section, a JC section, a TG section, a diverging section, a merging section, or the like) of a road where the vehicle is traveling, information related to the number of lanes of the road where the vehicle is traveling, and information related to a lane where the vehicle is traveling. The processor 150 may determine a possibility of cutting in depending on an environment of a road where the vehicle is traveling and a location of a lane where the vehicle is traveling. The processor 150 may obtain information related to a section of a road where the vehicle is traveling, information related to the total number of lanes of the road where the vehicle is traveling, information related to a lane where the vehicle is traveling, and the like using map information. The processor 150 may determine a level of a possibility that a surrounding vehicle located in a left lane of a right lane of the lane where the vehicle is traveling will cut in, based on the obtained information. A description will be provided in detail of an exemplary embodiment of determining a possibility of cutting in when the vehicle is traveling in a diverging section and a merging section, with reference to FIG. 5 and FIG. 6.

According to an exemplary embodiment of the present invention, the processor 150 may determine a level of a possibility that a surrounding vehicle which is traveling in the second lane will cut in, based on an average driving speed of a first lane where the vehicle is traveling and an average driving speed of a second lane adjacent to the first lane. According to an exemplary embodiment of the present invention, the average driving speed of the first lane may be an average speed of the vehicle or a preceding vehicle of the vehicle during a specified time interval. The average driving speed of the second lane may be an average speed of at least some of other vehicles which are traveling in the second lane during the specified time interval. For example, when the average driving speed of the first lane is faster than the average driving speed of the second lane, the processor 150 may increase a level of a possibility that the surrounding vehicle will cut in. When traffic of the first lane is less than traffic of the second lane, the processor 150 may determine that there is a high possibility that a surrounding vehicle located in the second lane will cut in. In the instant case, since there is a high possibility that a speed of the vehicle will be faster than a speed of the surrounding vehicle, fast determination of an intention to cut in may be required to reduce the risk of a collision.

According to an exemplary embodiment of the present invention, the processor 150 may determine a level of a possibility that a surrounding vehicle will cut in, based on curvature of a road where the vehicle is traveling or a change amount in curvature. For example, when the curvature is smaller than a specified value, the processor 150 may reduce a level of a possibility that the surrounding vehicle will cut in. When curvature of a road where the vehicle is traveling is small, when a change amount in curvature is large, or when a yaw rate of the vehicle is high, determination of a lateral location and a lateral speed of the surrounding vehicle may be inaccurate. Furthermore, when curvature is small or when a change amount in curvature is large, there may be a high possibility that the surrounding vehicle will be biased in a lane. Thus, a possibility of incorrectly recognizing an intention for the surrounding vehicle to cut in may be reduced by determining a possibility of cutting in as being low.

According to an exemplary embodiment of the present invention, the processor 150 may select a parameter for determining an intention for the surrounding vehicle to cut in among predetermined parameters based on obtained information. The parameter may include, for example, at least a portion of a lateral location, a lateral speed, a lateral acceleration, and behavior duration of the surrounding vehicle. The processor 150 may select one of a plurality of previously stored lateral location parameters, may select one of a plurality of previously stored lateral speed parameters, may select one of a plurality of previously stored lateral acceleration parameters, and may select one of a plurality of previously stored lateral behavior duration parameters, based on obtained information.

According to an exemplary embodiment of the present invention, the processor 150 may determine a level of a possibility of cutting in based on one of a road environment, traffic, and road curvature. A relationship among a possibility of cutting in according to a road environment, a level of a possibility of cutting in, a parameter of determining an intention to cut in, and a time upon determining an intention to cut in may be included in Table 1.

TABLE 1

| Possibility of cutting in according to a road environment | Level of a possibility of cutting in | Parameter of determining an intention to cut in | Time upon determining an intention to cut in |
| --- | --- | --- | --- |
| Normal | Level 0 | High | Slow |
| High | Level 1 | Normal | Normal |
| Very high | Level 2 | Low | Fast |

According to an exemplary embodiment of the present invention, the processor 150 may determine a first level of a possibility of cutting in based on information associated with a road environment and may determine a second level of a possibility of cutting in based on information associated with traffic. The processor 150 may determine a third level of a possibility of cutting in based on information associated with road curvature and may determine a level of a possibility of cutting in based on the first level, the second level, and the third level. A level of a possibility of cutting in according to a criterion of determining a possibility of cutting in may be included in Table 2.

TABLE 2

| Criterion for determining a possibility of cutting in | Level of a possibility of cutting in | | | |
| --- | --- | --- | --- | --- |
| | Low | Normal | High | Very high |
| Road environment | — | 0 | 1 | 2 |
| Traffic | — | 0 | 1 | 2 |
| Road curvature | −1 | 0 | — | — |

A final level of a possibility of cutting in may be matched like Table 3 according to the sum of a level of a possibility of cutting in according to a road environment, a level of a possibility of cutting in according to traffic, and a level of a possibility of cutting in according to road curvature.

TABLE 3

| Sum of levels of possibilities of cutting in | Final level of a possibility of cutting in | Parameter of determining an intention to cut in | Time upon determining an intention to cut in |
| --- | --- | --- | --- |
| −1 | Level 0 | High | Slow |
| 0 | | | |
| 1 | Level 1 | Normal | Normal |
| 2 | | | |
| 3 | Level 2 | Low | Fast |
| 4 | | | |

According to an exemplary embodiment of the present invention, the processor 150 may determine a plurality of levels of possibilities of cutting in, based on obtained information and may determine a minimum value or a maximum value among the plurality of levels as a level of a possibility of cutting in. For example, the processor 150 may obtain a maximum value among levels of possibilities of cutting in according to road curvature and levels of possibilities of cutting in according to traffic. The processor 150 may obtain a minimum value among the obtained maximum value and levels of possibilities of cutting in according to road curvature. The processor 150 may determine the obtained minimum value as a final level of a possibility of cutting in. A level of a possibility of cutting in according to a criterion for determining a possibility of cutting in may be included in Tables 4 and 5.

TABLE 4

| Criterion for determining a | Level of a possibility of cutting in | | |
|---|---|---|---|
| possibility of cutting in | Normal | High | Very high |
| Road environment | 0 | 1 | 2 |
| Traffic | 0 | 1 | 2 |

TABLE 5

| Criterion for determining a | Level of a possibility of cutting in | | |
|---|---|---|---|
| possibility of cutting in | Very low | Low | Normal |
| Road curvature | 0 | 1 | 2 |

For example, when a level according to a road environment is 2, when a level according to traffic is 1, and when a level according to road curvature is 1, a final level of a possibility of cutting in may be 1. For another example, when a level according to a road environment is 2, when a level according to traffic is 1, and when a level according to road curvature is 0, a final level of a possibility of cutting in may be 0. For another example, when a level according to a road environment is 1, when a level according to traffic is 2, and when a level according to road curvature is 2, a final level of a possibility of cutting in may be 2. A parameter of determining an intention to cut in and a time upon determining an intention to cut in according to a final level of a possibility of cutting in may be included in Table 6.

TABLE 6

| Final level of a possibility of cutting in | Parameter of determining an intention to cut in | Time upon determining an intention to cut in |
|---|---|---|
| Level 0 | High | Slow |
| Level 1 | Normal | Normal |
| Level 2 | Low | Fast |

A possibility of cutting in and a parameter of determining an intention to cut in may be determined by the other various methods.

Figure 2:
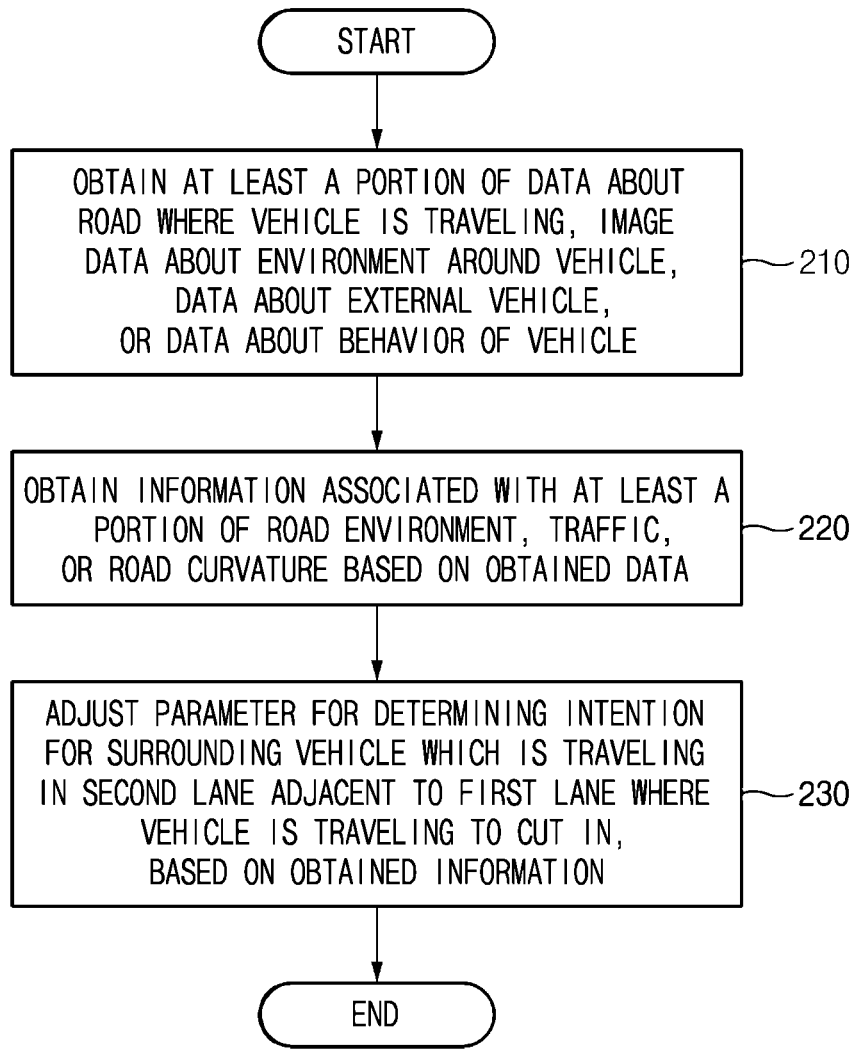
FIG. 2 is a flowchart illustrating a method for determining an intention to cut in in a vehicle according to an exemplary embodiment of the present invention.

FIG. 2 is a flowchart illustrating a method for determining an intention to cut in in a vehicle according to an exemplary embodiment of the present invention.

Hereinafter, it may be assumed that an apparatus 100 of FIG. 1 performs a process of FIG. 2. Furthermore, in a description of FIG. 2, an operation referred to as being performed by an apparatus may be understood as being controlled by a processor 150 of the apparatus 100.

Referring to FIG. 2, in operation 210, the apparatus may obtain at least a portion of data about a road where a vehicle is traveling, image data about an environment around the vehicle, data about an external vehicle, or data about behavior of the vehicle. For example, the apparatus may obtain various data using a navigation module, a camera, a radar, a sensor, and the like.

In operation 220, the apparatus may obtain information associated with at least a portion of a road environment, traffic, or road curvature based on the obtained data. For example, the apparatus may obtain information related to a section of a road where the vehicle is traveling, information related to the number of lanes of the road where the vehicle is traveling, information related to a lane where the vehicle is traveling, and the like from the obtained data. The apparatus may obtain information related to an average driving speed of a first lane where the vehicle is traveling and an average driving speed of a second lane adjacent to the first lane from the obtained data. The apparatus may obtain information related to curvature of the road where the vehicle is traveling or a change amount in curvature from the obtained data.

In operation 230, the apparatus may adjust a parameter for determining an intention for a surrounding vehicle which is traveling in the second lane adjacent to the first lane where the vehicle is traveling to cut in, based on the obtained information. For example, the apparatus may determine a possibility that the surrounding vehicle will cut in, based on the obtained information and may adjust a parameter, such as a lateral location, a lateral speed, a lateral acceleration, and/or behavior duration which is/are criteria of determining an intention to cut in, based on the possibility that the surrounding vehicle will cut in.

Figure 3:
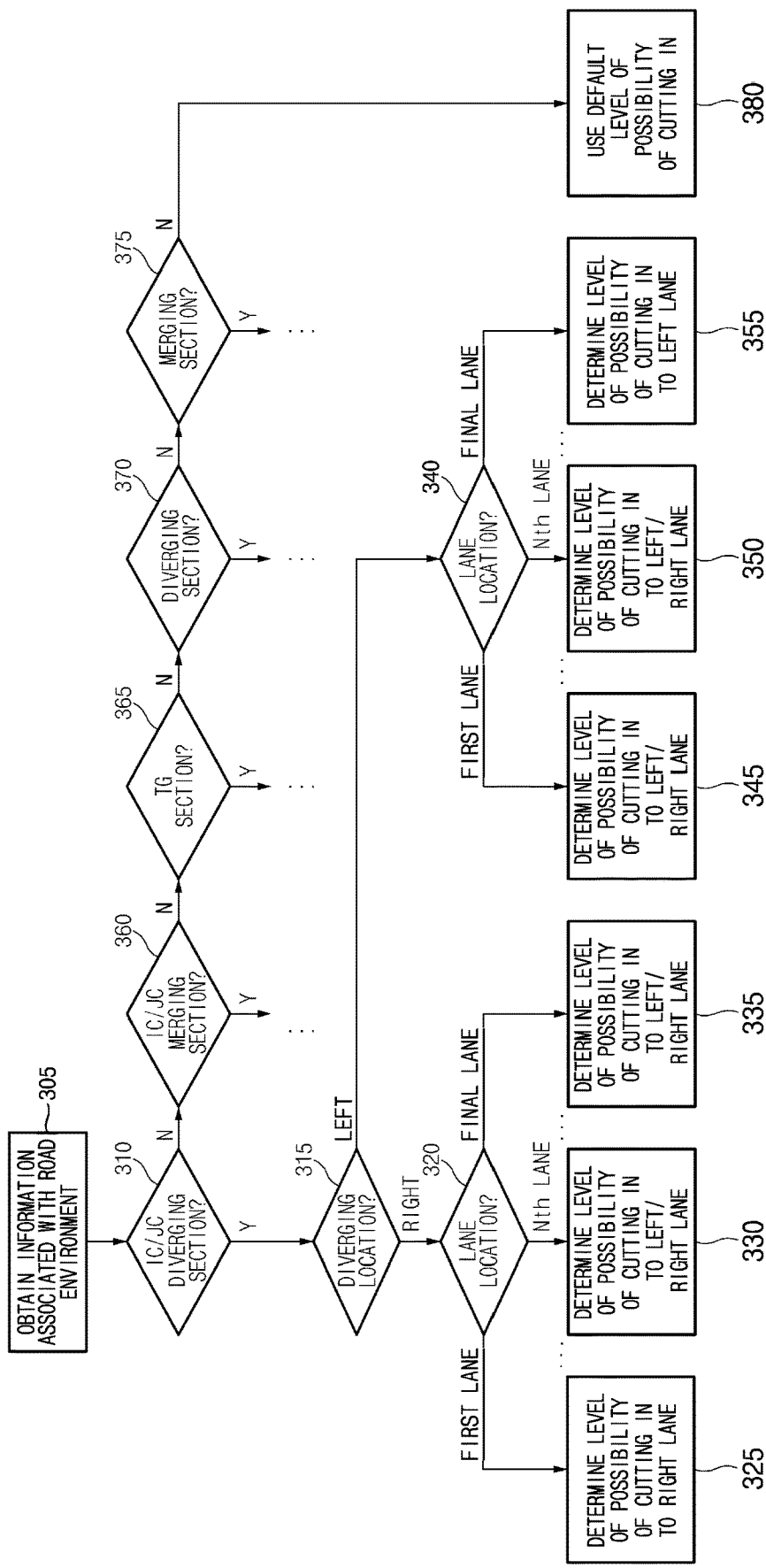
FIG. 3 is a flowchart illustrating a method for determining an intention to cut in in a vehicle according to an exemplary embodiment of the present invention.

FIG. 3 is a flowchart illustrating a method for determining an intention to cut in in a vehicle according to an exemplary embodiment of the present invention.

Hereinafter, it may be assumed that an apparatus 100 of FIG. 1 performs a process of FIG. 3. Furthermore, in a description of FIG. 3, an operation referred to as being performed by an apparatus may be understood as being controlled by a processor 150 of the apparatus 100.

Referring to FIG. 3, in operation 305, the apparatus may obtain information associated with a road environment. For example, the apparatus may obtain information indicating whether a road section where a vehicle is traveling is an IC/JC diverging section, an IC/JC merging section, a TG section, a diverging section, or a merging section.

In operation 310, the apparatus may determine whether the road section where the vehicle is traveling is the IC/JC diverging section. For example, the apparatus may determine whether the road section where the vehicle is traveling is the IC/JC diverging section based on the information obtained in operation 305.

When the road section where the vehicle is traveling is the IC/JC diverging section, in operation 315, the apparatus may determine a diverging location. For example, the apparatus may determine whether the diverging location is the left or the right.

When the diverging location is the right, in operation 320, the apparatus may determine a location of a lane where the vehicle is traveling. For example, the apparatus may determine whether the lane where the vehicle is traveling is an nth lane.

When the lane where the vehicle is traveling is a first lane, in operation 325, the apparatus may determine a level of a possibility that a surrounding vehicle which is traveling in a right lane of the vehicle will cut in.

When the lane where the vehicle is traveling is the nth lane, for example, when the lane where the vehicle is traveling is not the first lane or a final lane, in operation 330, the apparatus may determine a level of a possibility that a surrounding vehicle which is traveling in a left lane and a right lane of the vehicle will cut in.

When the lane where the vehicle is traveling is the final lane, in operation 335, the apparatus may determine a level of a possibility that a surrounding vehicle which is traveling in a left lane and a right lane (a diverging lane) of the vehicle will cut in.

When the diverging location is the left, in operation 340, the apparatus may determine a location of a lane where the vehicle is traveling.

When the lane where the vehicle is traveling is the first lane, in operation 345, the apparatus may determine a level of a possibility that a surrounding vehicle which is traveling in a left lane (a diverging lane) and a right lane of the vehicle will cut in.

When the lane where the vehicle is traveling is the nth lane, for example, when the lane where the vehicle is traveling is not the first lane or the final lane, in operation 350, the apparatus may determine a level of a possibility that a surrounding vehicle which is traveling in a left lane and a right lane of the vehicle will cut in.

When the lane where the vehicle is traveling is the final lane, in operation 355, the apparatus may determine a level of a possibility that a surrounding vehicle which is traveling in a left lane of the vehicle will cut in.

When the road section where the vehicle is traveling is not the IC/JC diverging section, in operation 360, the apparatus may determine whether the road section where the vehicle is traveling is the IC/JC merging section. When the road section where the vehicle is traveling is the IC/JC merging section, the apparatus may perform a process for the IC/JC merging section in a similar manner to operations 315 to 355.

When the road section where the vehicle is traveling is not the IC/JC merging section, in operation 365, the apparatus may determine whether the road section where the vehicle is traveling is the TG section. When the road section where the vehicle is traveling is the TG section, the apparatus may perform a process for the TG section in a similar manner to operations 315 to 355.

When the road section where the vehicle is traveling is not the TG section, in operation 370, the apparatus may determine whether the road section where the vehicle is traveling is the diverging section. When the road section where the vehicle is traveling is the diverging section, the apparatus may perform a process for the diverging section in a similar manner to operations 315 to 355.

When the road section where the vehicle is traveling is not the diverging section, in operation 375, the apparatus may determine whether the road section where the vehicle is traveling is the merging section. When the road section where the vehicle is traveling is the merging section, the apparatus may perform a process for the merging section in a similar manner to operations 315 to 355.

When the road section where the vehicle is traveling is not the merging section, in operation 380, the apparatus may use a default level of a possibility of cutting in. The apparatus may determine an intention to cut in based on the default level.

Figure 4:
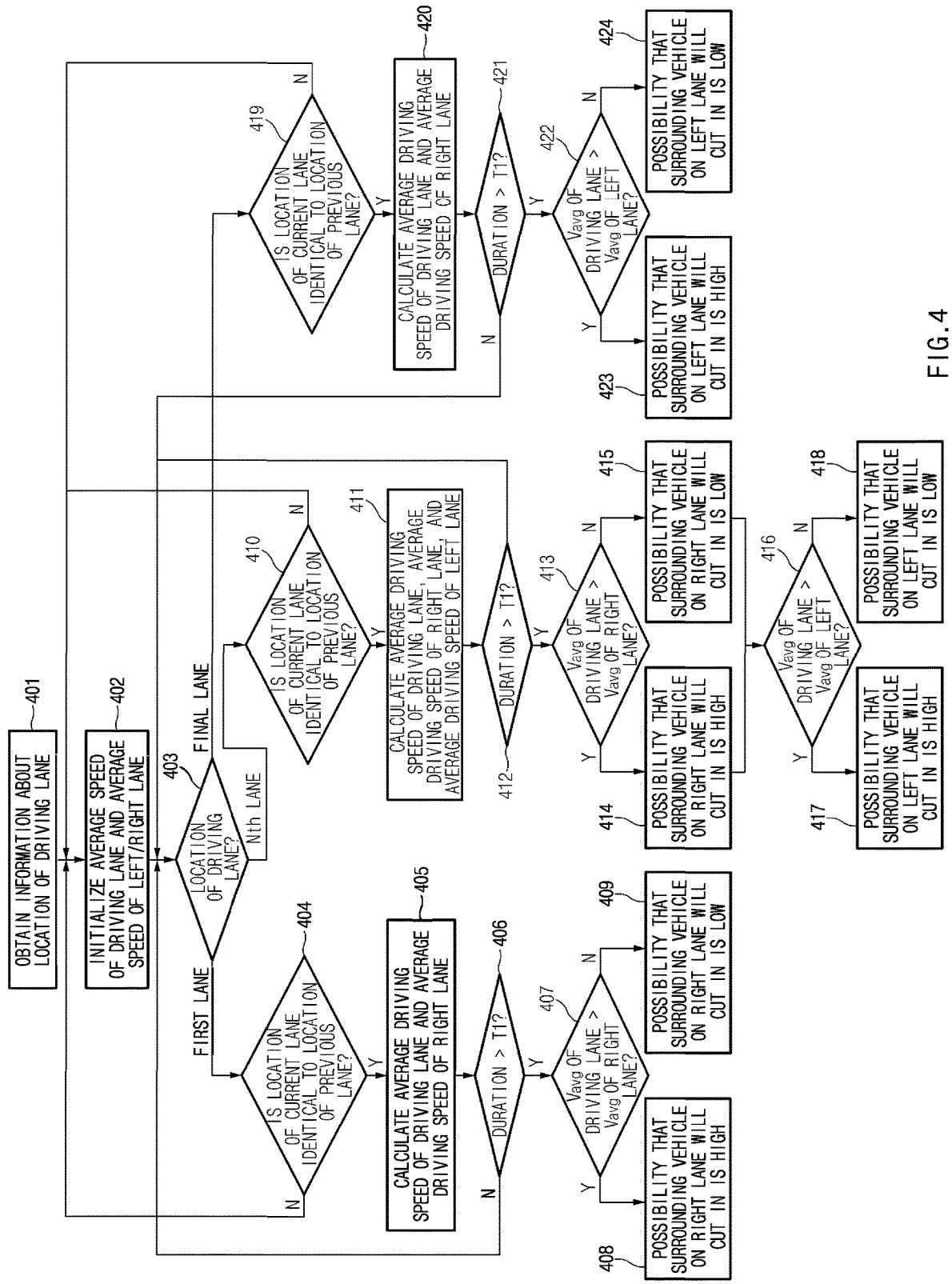
FIG. 4 is a flowchart illustrating a method for determining an intention to cut in in a vehicle according to an exemplary embodiment of the present invention.

FIG. 4 is a flowchart illustrating a method for determining an intention to cut in in a vehicle according to an exemplary embodiment of the present invention.

Hereinafter, it may be assumed that an apparatus 100 of FIG. 1 performs a process of FIG. 4. Furthermore, in a description of FIG. 4, an operation referred to as being performed by an apparatus may be understood as being controlled by a processor 150 of the apparatus 100.

Referring to FIG. 4, in operation 401, the apparatus may obtain information related to a location of a driving lane. For example, the apparatus may obtain information indicating whether the driving lane is an nth lane.

In operation 402, the apparatus may initialize an average speed of the driving lane, an average speed of a left lane of the driving lane, and an average speed of a right lane of the driving lane. For example, the apparatus may initialize a previously determined average speed.

In operation 403, the apparatus may determine a location of the driving lane. For example, the apparatus may determine whether the location of the driving lane is an nth lane.

In operation 404, the apparatus may determine whether a location of a current driving lane is identical to a location of a previous driving lane. When the location of the current driving lane is not identical to the location of the previous driving lane, the apparatus may perform operation 402 again.

When the location of the current driving lane is identical to the location of the previous driving lane, in operation 405, the apparatus may determine an average driving speed of the driving lane and an average driving speed of the right lane of the driving lane.

In operation 406, the apparatus may determine whether duration of the average driving speed of the driving lane and the average driving speed of the right lane is larger than a specified value T1. When the duration is less than or equal to the specified value T1, the apparatus may perform operation 403 again.

When the duration is greater than the specified value T1, in operation 407, the apparatus may determine whether the average driving speed Vavg of the driving lane is greater than the average driving speed Vavg of the right lane.

When the average driving speed Vavg of the driving lane is greater than the average driving speed Vavg of the right lane, in operation 408, the apparatus may determine that a possibility that a surrounding vehicle on the right lane will cut in is high.

When the average driving speed Vavg of the driving lane is less than or equal to the average driving speed Vavg of the right lane, in operation 409, the apparatus may determine that the possibility that the surrounding vehicle on the right lane will cut in is low.

When the lane where the vehicle is traveling is the nth lane, for example, when the lane where the vehicle is traveling is not a first lane or a final lane, in operation 410, the apparatus may determine whether the location of the current driving lane is identical to the location of the previous driving lane. When the location of the current driving lane is not identical to the location of the previous driving lane, the apparatus may perform operation 402 again.

When the location of the current driving lane is identical to the location of the previous driving lane, in operation 411, the apparatus may determine an average driving speed of the driving lane, an average driving speed of a right lane of the driving lane, and an average driving speed of a right lane of the driving lane.

In operation 412, the apparatus may determine whether duration of the average driving speed of the driving lane, the average driving speed of the right lane, and the average driving speed of the left lane is greater than the specified value T1. When the duration is less than or equal to the specified value T1, the apparatus may perform operation 403 again.

When the duration is greater than the specified value T1, in operation 413, the apparatus may determine whether the average driving speed Vavg of the driving lane is greater than the average driving speed Vavg of the right lane.

When the average driving speed Vavg of the driving lane is greater than the average driving speed Vavg of the right lane, in operation 414, the apparatus may determine that a possibility that a surrounding vehicle on the right lane will cut in is high.

When the average driving speed Vavg of the driving lane is less than or equal to the average driving speed Vavg of the right lane, in operation 415, the apparatus may determine that the possibility that the surrounding vehicle on the right lane will cut in is low.

In operation 416, the apparatus may determine whether the average driving speed Vavg of the driving lane is greater than the average driving speed Vavg of the left lane.

When the average driving speed Vavg of the driving lane is greater than the average driving speed Vavg of the left lane, in operation 417, the apparatus may determine that a possibility that a surrounding vehicle on the left lane will cut in is high.

When the average driving speed Vavg of the driving lane is less than or equal to the average driving speed Vavg of the left lane, in operation 418, the apparatus may determine that the possibility that the surrounding vehicle on the left lane will cut in is low.

When the lane where the vehicle is traveling is the final lane, in operation 419, the apparatus may determine whether a location of a current driving lane is identical to a location of a previous driving lane. When the location of the current driving lane is not identical to the location of the previous driving lane, the apparatus may perform operation 402 again.

When the location of the current driving lane is identical to the location of the previous driving lane, the apparatus may determine an average driving speed of the driving speed and an average driving speed of a left lane of the driving lane.

In operation 421, the apparatus may determine whether duration of the average driving speed of the driving lane and the average driving speed of the left lane is greater than the specified value T1. When the duration is less than or equal to the specified value T1, the apparatus may perform operation 403 again.

When the duration is greater than the specified value T1, the apparatus may determine whether the average driving speed Vavg of the driving lane is greater than the average driving speed Vavg of the left lane.

When the average driving speed Vavg of the driving lane is greater than the average driving speed Vavg of the left lane, in operation 423, the apparatus may determine that a possibility that a surrounding vehicle on the left lane will cut in is high.

When the average driving speed Vavg of the driving lane is less than or equal to the average driving speed Vavg of the left lane, in operation 424, the apparatus may determine that the possibility that the surrounding vehicle on the left lane will cut in is low.

Figure 5:
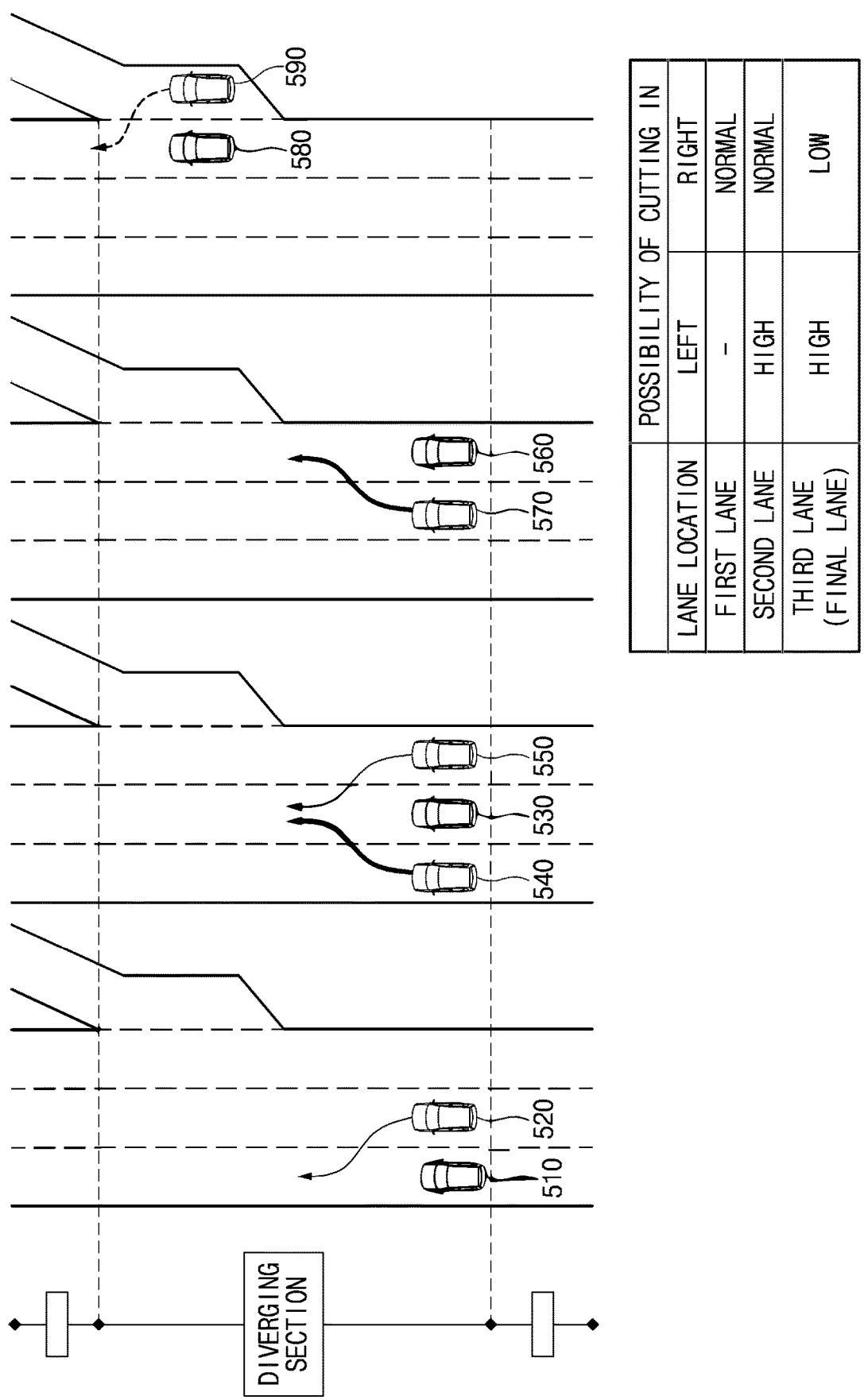
FIG. 5 is a drawing illustrating an exemplary operation of an apparatus configured for determining an intention to cut in in a vehicle according to an exemplary embodiment of the present invention.

FIG. 5 is a drawing illustrating an exemplary operation of an apparatus configured for determining an intention to cut in in a vehicle according to an exemplary embodiment of the present invention.

According to an exemplary embodiment of the present invention, when a road section where the vehicle is traveling is connected to an exit ramp, the vehicle may increase a level of a possibility that a surrounding vehicle located in a direction opposite to the exit ramp from the vehicle will cut in.

Referring to FIG. 5, when a vehicle 510 is traveling in a first lane of a diverging section, it may determine a possibility that a surrounding vehicle 520 which is traveling in a second lane will cut in. In the instant case, since the traveling of the surrounding vehicle 520 which is traveling in the second lane is unrelated to the diverging section, the vehicle 510 may determine the possibility that the surrounding vehicle 520 will cut in as being normal.

When a vehicle 530 is traveling in a second lane of a diverging section, it may determine a possibility that a left surrounding vehicle 540 which is traveling in a first lane will cut in and a possibility that a right surrounding vehicle 550 which is traveling in a third lane will cut in. In the instant case, since there is a possibility that the left surrounding vehicle 540 will enter the diverging road, the vehicle 530 may determine the possibility that the left surrounding vehicle 540 will cut in as being high. Meanwhile, since the traveling of the right surrounding vehicle 550 is unrelated to the diverging section, the vehicle 530 may determine the possibility that the right surrounding vehicle 550 will cut in as being normal.

When a vehicle 560 is traveling in a third lane of a diverging section, it may determine a possibility that a surrounding vehicle 570 which is traveling in a second lane will cut in. In the instant case, since there is a possibility that the surrounding vehicle 570 will enter a diverging road, the vehicle 560 may determine the possibility that the surrounding vehicle 570 will cut in as being high.

When a vehicle 580 is traveling in a third lane of a diverging section, it may determine a possibility that a surrounding vehicle 590 which is traveling in a diverging lane will cut in. In the instant case, since there is a low possibility that the surrounding vehicle 590 which enters the diverging lane will enter the third lane again, the vehicle 580 may determine the possibility that the surrounding vehicle 590 will cut in as being low.

Figure 6:
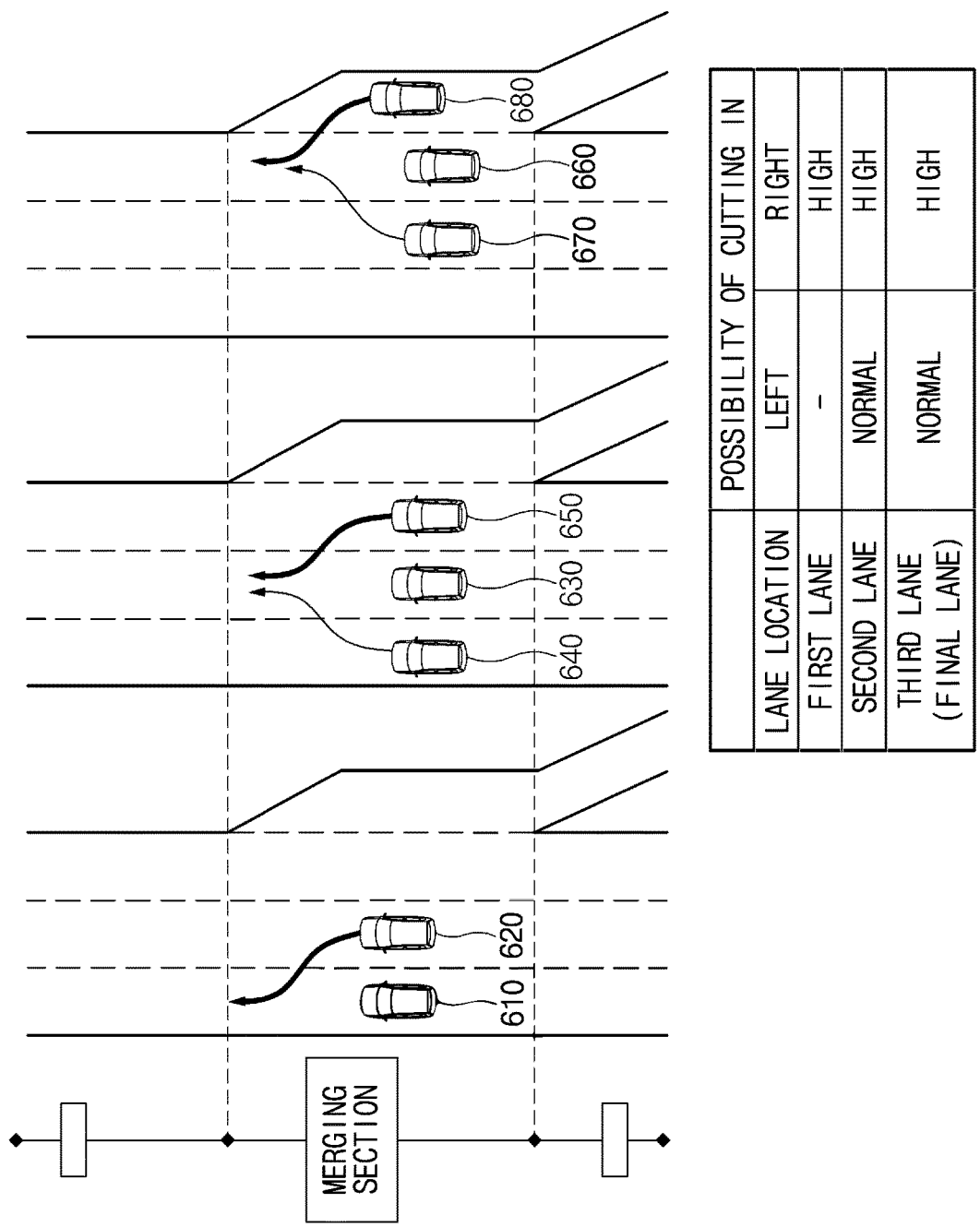
FIG. 6 is a drawing illustrating an exemplary operation of an apparatus configured for determining an intention to cut in in a vehicle according to an exemplary embodiment of the present invention.

FIG. 6 is a drawing illustrating an exemplary operation of an apparatus configured for determining an intention to cut in in a vehicle according to an exemplary embodiment of the present invention.

According to an exemplary embodiment of the present invention, when a road section where the vehicle is traveling is connected to an entrance ramp, the vehicle may increase a level of a possibility that a surrounding vehicle located in the same direction as the entrance ramp from the vehicle will cut in.

Referring to FIG. 6, when a vehicle 610 is traveling in a first lane of a merging section, it may determine a possibility that a surrounding vehicle 620 which is traveling in a second lane will cut in. In the instant case, since there is a high possibility that the surrounding vehicle 620 which is traveling in the merging section connected to a right merging road will cut in to the left, the vehicle 610 may determine the possibility that the surrounding vehicle 620 will cut in as being high.

When a vehicle 630 is traveling in a second lane of a merging section, it may determine a possibility that a left surrounding vehicle 640 which is traveling in a first lane will cut in and a possibility that a right surrounding vehicle 650 which is traveling in a third lane will cut in. In the instant case, since the traveling of the left surrounding vehicle 640 is unrelated to the merging section, the vehicle 630 may determine the possibility that the left surrounding vehicle 640 will cut in as being normal. Meanwhile, since there is a high possibility that the right surrounding vehicle 650 which is traveling in the merging section connected to a right merging road will cut in to the left, the vehicle 630 may determine the possibility that the right surrounding vehicle 650 will cut in as being high.

When a vehicle 660 is traveling in a third lane of a merging section, it may determine a possibility that a left surrounding vehicle 670 which is traveling in a second lane will cut in and a possibility that a right surrounding vehicle 680 which is traveling in a merging lane will cut in. In the instant case, since the traveling of the left surrounding vehicle 670 is unrelated to the merging section, the vehicle 660 may determine the possibility that the left surrounding vehicle 670 will cut in as being normal. Meanwhile, since the right surrounding vehicle 680 which is traveling in the merging lane should cut in to the left before the merging section is ended, the vehicle 660 may determine the possibility that the right surrounding vehicle 680 will cut in as being high.

Figure 7:
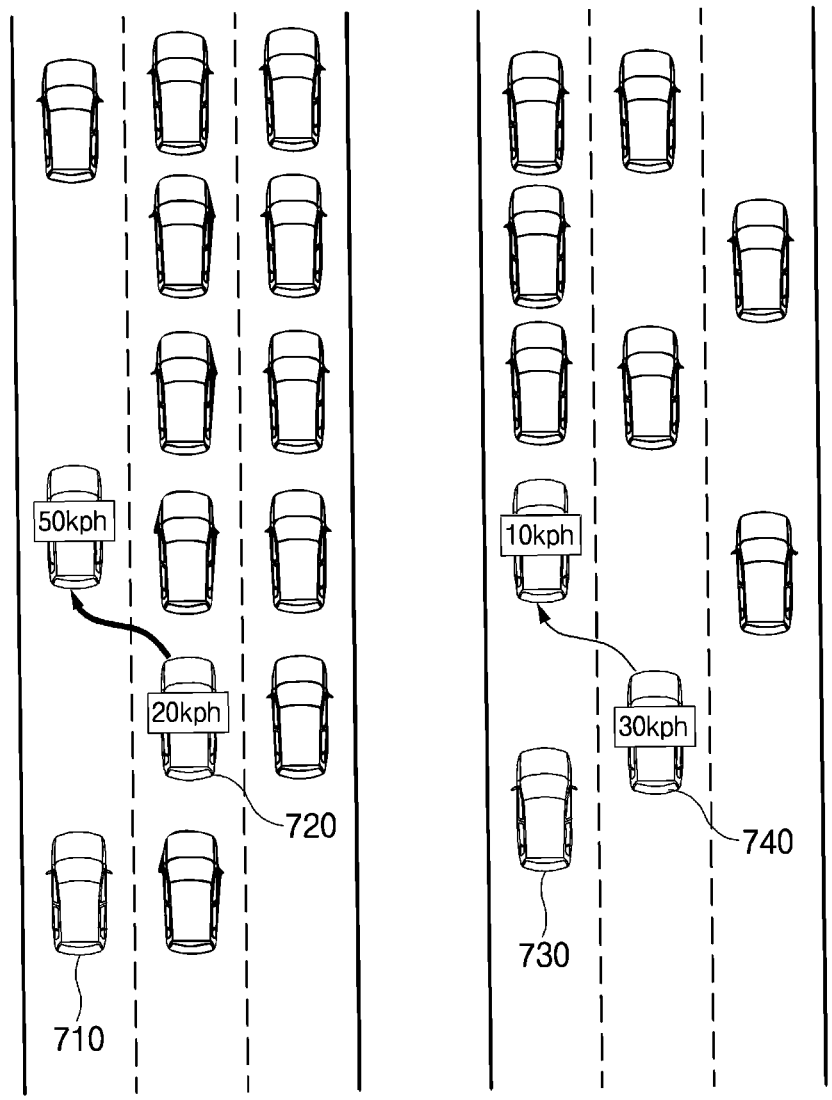
FIG. 7 is a drawing illustrating an exemplary operation of an apparatus configured for determining an intention to cut in in a vehicle according to an exemplary embodiment of the present invention.

FIG. 7 is a drawing illustrating an exemplary operation of an apparatus configured for determining an intention to cut in in a vehicle according to an exemplary embodiment of the present invention.

According to an exemplary embodiment of the present invention, when an average driving speed of a first lane where the vehicle is traveling is faster than an average driving speed of a second lane adjacent to the first lane, the vehicle may increase a level of a possibility that a surrounding vehicle will cut in.

Referring to FIG. 7, a vehicle 710 may be traveling in a first lane, and a surrounding vehicle 720 may be traveling in a second lane. An average speed of the first lane may be 50 kph, and an average speed of the second lane may be 20 kph. A probability of cutting in from a lane with high traffic to a lane with low traffic may be high. Thus, the vehicle 710 may determine a possibility that the surrounding vehicle 720 which is traveling in the second lane with relatively high traffic will cut in to the first lane with relatively low traffic as being high.

A vehicle 730 may be traveling in a first lane, and a surrounding vehicle 740 may be traveling in a second lane. An average speed of the first lane may be 10 kph, and an average speed of the second lane may be 30 kph. A probability of cutting in from a lane with low traffic to a lane with high traffic may be low. Thus, the vehicle 730 may determine a possibility that the surrounding vehicle 740 which is traveling in the second lane with relatively low traffic will cut in to the first lane with relatively high traffic as being normal.

Figure 8:
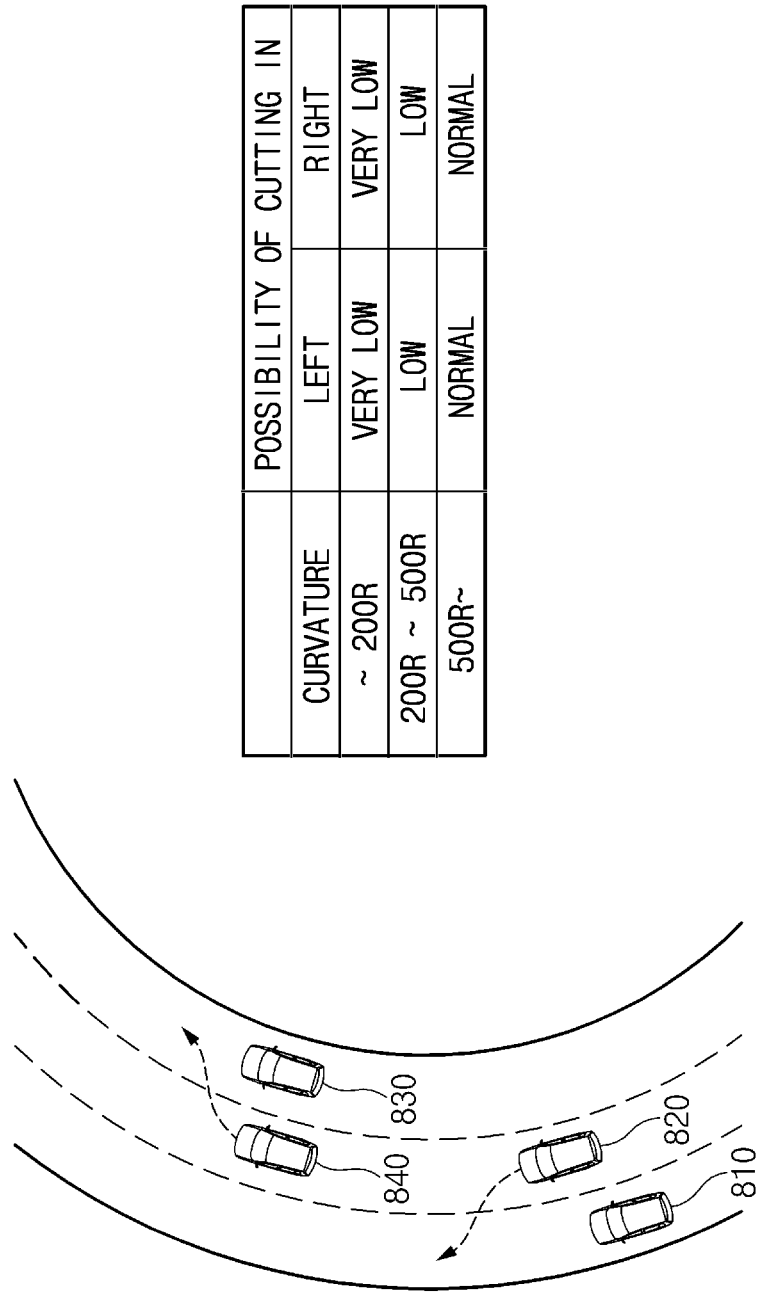
FIG. 8 is a drawing illustrating an exemplary operation of an apparatus configured for determining an intention to cut in in a vehicle according to an exemplary embodiment of the present invention.

FIG. 8 is a drawing illustrating an exemplary operation of an apparatus configured for determining an intention to cut in in a vehicle according to an exemplary embodiment of the present invention.

According to an exemplary embodiment of the present invention, when curvature is less than a specified value, the vehicle may reduce a level of a possibility that a surrounding vehicle will cut in.

Referring to FIG. 8, a vehicle 810 and a surrounding vehicle 820 may travel on a curved road. Curvature of the curved road may be 400 R. Although the surrounding vehicle 820 does not have an intention to cut in, it may travel in a left end portion of a second lane on the curved road. In the instant case, when the vehicle 810 determines an intention to cut in based on a usual lateral location parameter, a possibility of incorrect determination may be high. Thus, the vehicle 810 may determine a possibility that the surrounding vehicle 820 will cut in as being low and may adjust a parameter.

A vehicle 830 and a surrounding vehicle 840 may travel on a curved road. Curvature of the curved road may be 300 R. When curvature of a road is small, accuracy in which the vehicle 830 measures a lateral location and a lateral speed of the surrounding vehicle 840 may be reduced. Thus, a possibility that the vehicle 830 incorrectly determine an intention to cut in may be high. Thus, the vehicle 830 may determine a possibility that the surrounding vehicle 840 will cut in as being low and may adjust a parameter.

For example, when curvature of a road is less than or equal to 200 R, a vehicle may determine a possibility of cutting in as being very low. When curvature of the road is 200 R to 500 R, the vehicle may determine the possibility of cutting in as being low. When curvature of the road is greater than or equal to 500 R, the vehicle may determine the possibility of cutting in as being normal.

Figure 9:
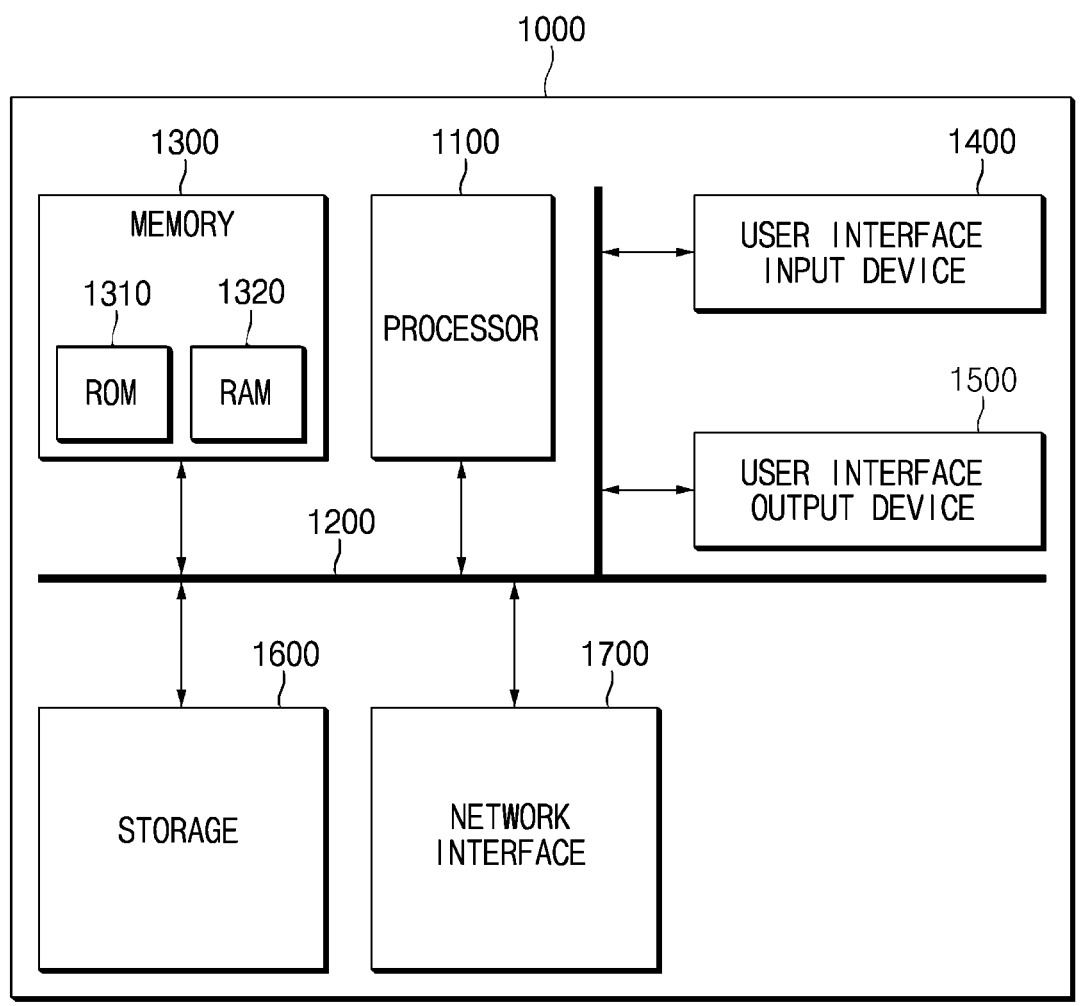
FIG. 9 is a block diagram illustrating a configuration of a computing system according to an exemplary embodiment of the present invention.

FIG. 9 is a block diagram illustrating a configuration of a computing system according to an exemplary embodiment of the present invention.

Referring to FIG. 9, the above-mentioned method for determining an intention to cut in in a vehicle according to an exemplary embodiment of the present invention may be implemented through the computing system. A computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device configured for executing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the exemplary embodiments included in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus configured for determining an intention to cut in the vehicle according to an exemplary embodiment of the present invention may rapidly cope with a surrounding vehicle cutting in when a possibility of cutting in is high and may reduce a possibility of incorrectly recognizing the surrounding vehicle cutting in when the possibility of cutting in is low by determining the possibility that the surrounding vehicle will cut in using a variety of information such as a road environment, traffic, road curvature, and/or the like.

Furthermore, various effects indirectly or directly ascertained through the present invention may be provided.

While the present invention has been described with reference to exemplary embodiments of the present invention, it will be apparent to those skilled in the art that various changes and modifications may be made without departing from the spirit and scope of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for determining an intention of a surrounding vehicle to cut-in in a host vehicle, the apparatus comprising:
    a navigation module configured to obtain data about a road where the host vehicle is traveling;
    a camera configured to obtain image data about an environment around the host vehicle;
    a radar configured to obtain data about an external vehicle;
    a sensor configured to obtain data about behavior of the host vehicle; and
    a processor configured to be electrically connected to the navigation module, the camera, the radar, and the sensor,
    wherein the processor is configured to:
        obtain information associated with the road where the host vehicle is traveling based on data obtained using at least a portion of the navigation module, the camera, the radar, or the sensor;
        determine a level of a possibility that the surrounding vehicle will cut-in in front of the host vehicle, based on the obtained information, wherein the surrounding vehicle is traveling in a second lane adjacent to a first lane where the host vehicle is traveling; and
        adjust a parameter for determining the intention for the surrounding vehicle to cut-in in front of the host vehicle, based on the level of the possibility, and
    wherein the information associated with the road includes information associated with a road curvature.

2. A method for determining an intention of a surrounding vehicle to cut-in in front of a host vehicle, the method comprising:
    obtaining, by a processor, at least a portion of data about a road where the host vehicle is traveling from a navigation module, image data about an environment around the host vehicle, data about an external vehicle, or data about behavior of the host vehicle;
    obtaining, by the processor, information associated with a road curvature based on the obtained at least a portion of data, and determining, by the processor, a level of a possibility that the surrounding vehicle will cut-in in front of the host vehicle, based on the obtained information, wherein the surrounding vehicle is traveling in a second lane adjacent to a first lane where the host vehicle is traveling; and
    adjusting, by the processor, a parameter for determining the intention for the surrounding vehicle to cut-in in front of the host vehicle, based on the obtained information.

3. The method of claim 2, wherein the adjusting includes:
    selecting the parameter for determining the intention for the surrounding vehicle to cut-in in front of the host vehicle among predetermined parameters based on the obtained information.

4. The apparatus of claim 1, wherein the processor is configured to:
    determine the level of the possibility that the surrounding vehicle will cut-in in front of the host vehicle, based on information related to a section of the road where the host vehicle is traveling, information related to a number of lanes of the road where the host vehicle is traveling, and information related to a lane where the host vehicle is traveling.

5. The apparatus of claim 4, wherein the processor is configured to:
    when a road section where the host vehicle is traveling is connected to an exit ramp, increase the level of the possibility that the surrounding vehicle located in a direction opposite to the exit ramp from the host vehicle will cut-in in front of the host vehicle.

6. The apparatus of claim 4, wherein the processor is configured to:
    when a road section where the host vehicle is traveling is connected to an entrance ramp, increase the level of the possibility that the surrounding vehicle located in a same direction as the entrance ramp from the host vehicle will cut-in in front of the host vehicle.

7. The apparatus of claim 1, wherein the processor is configured to:
    determine the level of the possibility that the surrounding vehicle will cut-in in front of the host vehicle, based on an average driving speed of the first lane and an average driving speed of the second lane.

8. The apparatus of claim 7, wherein the average driving speed of the first lane is an average speed of the host vehicle or a preceding vehicle of the host vehicle during a time interval, and
    wherein the average driving speed of the second lane is an average speed of at least one of other vehicles which are traveling in the second lane during the time interval.

9. The apparatus of claim 8, wherein the processor is configured to:
    when the average driving speed of the first lane is faster than the average driving speed of the second lane, increase the level of the possibility that the surrounding vehicle will cut-in in front of the host vehicle.

10. The apparatus of claim 1, wherein the processor is configured to:
   determine the level of the possibility that the surrounding vehicle will cut-in in front of the host vehicle, based on curvature radius of the road where the host vehicle is traveling or a change amount in the road curvature of the road.

11. The apparatus of claim 10, wherein the processor is configured to:
   when the curvature radius of the road is less than a predetermined value, reduce the level of the possibility that the surrounding vehicle will cut-in in front of the host vehicle.

12. The apparatus of claim 1, wherein the processor is configured to:
   select the parameter for determining the intention for the surrounding vehicle to cut-in in front of the host vehicle among predetermined parameters based on the obtained information.

13. The apparatus of claim 1, wherein the processor is configured to:
   determine a first level of the possibility of cutting-in in front of the host vehicle based on information associated with the road environment;
   determine a second level of the possibility of cutting-in in front of the host vehicle based on information associated with the traffic;
   determine a third level of the possibility of cutting-in in front of the host vehicle based on information associated with the road curvature; and
   determine the level of the possibility that the surrounding vehicle will cut-in in front of the host vehicle, based on the first level, the second level, and the third level.

14. The apparatus of claim 13, wherein the processor is configured to:
   determine a maximum value among the first level and the second level; and
   determine a minimum value among the maximum value and the third level as the level of the possibility that the surrounding vehicle will cut-in in front of the host vehicle.

15. The method of claim 2, wherein the determining includes:
   determining the level of the possibility that the surrounding vehicle will cut-in in front of the host vehicle, based on the road curvature of the road where the host vehicle is traveling or a change amount in the road curvature of the road.

16. The method of claim 2, wherein the determining includes:
   determining the level of the possibility that the surrounding vehicle will cut-in in front of the host vehicle, based on an average driving speed of the first lane and an average driving speed of the second lane.

17. The method of claim 2, wherein the determining includes:
   determining the level of the possibility that the surrounding vehicle will cut-in in front of the host vehicle, based on information related to a section of the road where the host vehicle is traveling, information related to a number of lanes of the road where the host vehicle is traveling, and information related to a lane where the host vehicle is traveling.

\* \* \* \* \*